United States Patent
Lee et al.

(10) Patent No.: US 7,319,600 B2
(45) Date of Patent: Jan. 15, 2008

(54) APPARATUS FOR SUPPLYING POWER AND LIQUID CRYSTAL DISPLAY HAVING THE SAME

(75) Inventors: Inn-Sung Lee, Suwon-si (KR); Moon-Shik Kang, Seongnam-si (KR); Song-Yi Han, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 355 days.

(21) Appl. No.: 10/479,814

(22) PCT Filed: Jun. 10, 2002

(86) PCT No.: PCT/KR02/01090

§ 371 (c)(1),
(2), (4) Date: Dec. 5, 2003

(87) PCT Pub. No.: WO03/005110

PCT Pub. Date: Jan. 16, 2003

(65) Prior Publication Data

US 2004/0145584 A1    Jul. 29, 2004

(30) Foreign Application Priority Data

Jul. 3, 2001 (KR) ............... 2001-39548
Jun. 7, 2002 (KR) ............... 2002-32008

(51) Int. Cl.
*H02M 3/335* (2006.01)
*H02M 5/40* (2006.01)

(52) U.S. Cl. ............... 363/21.02; 363/34; 363/97

(58) Field of Classification Search ............ 363/15–17, 363/22, 23, 98, 132, 21.02, 34, 35, 37, 97, 363/131; 315/209 R, 210, 211, 219, 220, 315/247
See application file for complete search history.

(56) References Cited

U.S. PATENT DOCUMENTS

| | | | | |
|---|---|---|---|---|
| 5,566,060 A | * | 10/1996 | Shimer et al. | 363/65 |
| 5,747,942 A | * | 5/1998 | Ranganath | 315/224 |
| 6,072,283 A | * | 6/2000 | Hedrei et al. | 315/307 |
| 6,329,636 B1 | * | 12/2001 | Geissler | 219/130.1 |
| 6,538,909 B2 | * | 3/2003 | Goodarzi et al. | 363/98 |

FOREIGN PATENT DOCUMENTS

| | | |
|---|---|---|
| CN | 1118950 | 3/1996 |
| JP | 55-15575 | 2/1980 |
| JP | 3-293320 | 12/1991 |

* cited by examiner

*Primary Examiner*—Gary L Laxton
(74) *Attorney, Agent, or Firm*—Cantor Colburn LLP

(57) ABSTRACT

Disclosed are a power supplying apparatus and a LCD having the same that reduces manufacturing cost of a large-scale LCD module and enhances powpower efficiency by integrating an external dc power supply used in a large-scale LCD panel into a LCD panel. A first voltage converter converts an external ac voltage into a first dc voltage, and changes a voltage level of the first dc voltage into a second dc voltage having a highr voltage level than that of the first dc voltage. A second voltage converter converts the second dc voltage into an ac voltage, raises a voltage level of the converted ac voltage, and provides the raised ac voltage to a load. A current detector detects a current flowing through the load, and provides a current detection signal as a feedback signal to the first voltage converter so that the first voltage provide a constant direct current output voltage.

9 Claims, 7 Drawing Sheets

APPARATUS FOR SUPPLYING POWER AND LIQUID CRYSTAL DISPLAY HAVING THE SAME

TECHNICAL FIELD

The present invention relates to a liquid crystal display (LCD), and more particularly to a power supplying apparatus and a LCD having the same that reduces cost for manufacturing a large-scale LCD module and enhances power efficiency.

BACKGROUND ART

A LCD monitor is usually used in a notebook computer, the LCD monitor used in the notebook computer should be supplied with a power from a battery or an external dc (direct current) power supply due to characteristics of the notebook computer.

FIG. 1 is a block diagram illustrating a conventional LCD monitor used in a desktop computer.

Referring to FIG. 1, the conventional LCD monitor used in the desktop computer includes a power input section 10 and a LCD module 20. The power input section 10 includes an AC input section 12, an ac-to-dc rectifier 14 and a dc-to-dc converter 16. The LCD module 20 includes a dc-to-ac inverter 22, a backlight unit 23, a dc-to-dc converter 24 and a LCD panel section 25.

However, as shown in FIG. 1, an external dc power supply—i.e. an adaptor—is still used for the LCD monitor of the desktop computer. An exterior of the LCD monitor used in the desktop computer does not look neat because an external power supply is equipped with the LCD monitor by connecting the external dc power supply to the LCD monitor of the desktop computer.

In addition, a power is supplied from the external power supply, and then the power is converted into a power having a different power level appropriate for the LCD module, so that the power efficiency is reduced.

DISCLOSURE OF THE INVENTION

The present invention provides an adapter-free power supply having a built in dc power supply.

The present invention also provides a LCD that reduces cost for manufacturing the LCD and enhances power efficiency by integrating the external dc power supply into the LCD panel.

The present invention also provides a LCD that equipped with the adapter-free power supply having a built in dc power supply.

In one aspect of the invention, there is provided a power supplying apparatus, comprising: a first voltage converting means for converting a first alternating current voltage into a first direct current voltage, and for changing a voltage level of the first direct current voltage into a second direct current voltage having a higher voltage level than the voltage level of the first direct current voltage; a second voltage converting means for converting the second direct current voltage into a second alternating current voltage, and for changing a voltage level of the second alternating current voltage into a third alternating current voltage having a higher voltage level than the voltage level of the second alternating current voltage to provide the third alternating current voltage to a first load; and a current detector for detecting a current flowing through the first load, and for providing a current detecting signal to the first voltage converting means so that the first voltage converting means provide a constant direct current output voltage.

Preferably, the first voltage converting means comprises: a rectifying means for rectifying the first alternating current voltage into the first direct current voltage; and a dc-to-dc converter for converting the first direct current voltage into the second direct current voltage to provide the second direct current voltage to the second voltage converting means, and wherein the dc-to-dc converter varies the voltage level of the second direct current voltage in response to the detected current signal.

Preferably, the second voltage converting means is a royer inverter, and the second voltage converting means comprises: a transformer including a primary coil and a secondary coil, the primary coil of the transformer being connected to an output terminal of the first voltage converting means, and the secondary coil of the transformer being connected the first load; a resonance capacitor, being connected parallel with the primary coil, to form a LC resonance circuit; a first transistor, a base of the first transistor being connected to the output terminal of the first voltage converting means, a collector of the first transistor being connected to a first end of the resonance capacitor, and an emitter of the first transistor being connected to a ground, for driving the transformer; a second transistor, a base of the second transistor being connected to the output terminal of the first voltage converting means, a collector of the second transistor being connected to a second end of the resonance capacitor, and an emitter of the second transistor being connected to the ground, for driving the transformer.

In addition, preferably, the first voltage converting means further generates a third directing current voltage having a voltage level lower than the voltage level of the first direct current voltage and provides the third direct current voltage to a second load, by receiving the first alternating current voltage. The power supplying apparatus further comprises a third voltage converting means for providing the third direct current voltage to the second load.

In another aspect of the invention, there is provided a LCD apparatus, comprising: a LCD panel driving means for generating a driving signal; a LCD panel for displaying an image based on the driving signal from the LCD panel driving means; a backlight unit, disposed under the LCD panel, for providing a light to the LCD panel; a first voltage converting means for converting a first alternating current voltage into a first direct current voltage; a second voltage converting means for converting the first direct current voltage into a second alternating current voltage to provide the second alternating current voltage to the backlight unit; and a third voltage converting means for converting the first direct current voltage into a second directing current voltage to provide the second directing current voltage to the LCD panel driving means.

Preferably, the first voltage converting means performs a power factor correction function when converting the first alternating current voltage into the first direct current voltage.

In addition, preferably, the first voltage converting means comprises a diode rectifier circuit or an active PWM rectifier circuit.

Preferably, the second voltage converting means comprises one selected from the group consisting of a buck converter, a boost converter, a half-bridge converter, a flyback converter, a push-pull converter and a forward converter. In addition, preferably, the third voltage converting means comprises one selected from the group consisting of a royer Inverter, a push-pull Inverter, a half bridge Inverter and a full-bridge Inverter.

In further another aspect of the invention, there is provided a LCD apparatus, comprising: a LCD panel for displaying an image based on a driving signal from a plurality of LCD panel drivers; a backlight unit, disposed under the LCD panel, for providing a light to the LCD panel; a first voltage converting means for converting a first alternating current voltage into a first direct current voltage, and for changing a voltage level of the first direct current voltage into a second direct current voltage having a higher voltage level than the voltage level of the first direct current voltage in respond to a voltage raising-control signal; a second voltage converting means for converting the second direct current voltage into a second alternating current voltage, and for changing a voltage level of the second alternating current voltage into a third alternating current voltage having a higher voltage level than the voltage level of the second alternating current voltage to provide the third alternating current voltage to the backlight unit; a current detector for detecting a current flowing through the backlight, and for providing the voltage raising-control signal to the first voltage converting means; and a third voltage converting means for converting the second directing current voltage into a plurality of third directing current voltage to provide the third direct current voltage to each of the LCD panel driver.

According to the present invention, the power supplying apparatus and the LCD having the same can provides a high voltage to the fluorescent lamp by a simple circuit, reduces manufacturing cost of a large-scale LCD module, and enhances power efficiency by integrating an external dc power supply used in a large-scale LCD panel into a LCD panel.

BRIEF DESCRIPTION OF DRAWINGS

The above and other advantages of the present invention will become readily apparent by describing an exemplary embodiment with reference to the accompanying drawings in which.

BEST MODE FOR CARRYING OUT THE INVENTION

Figure 1:
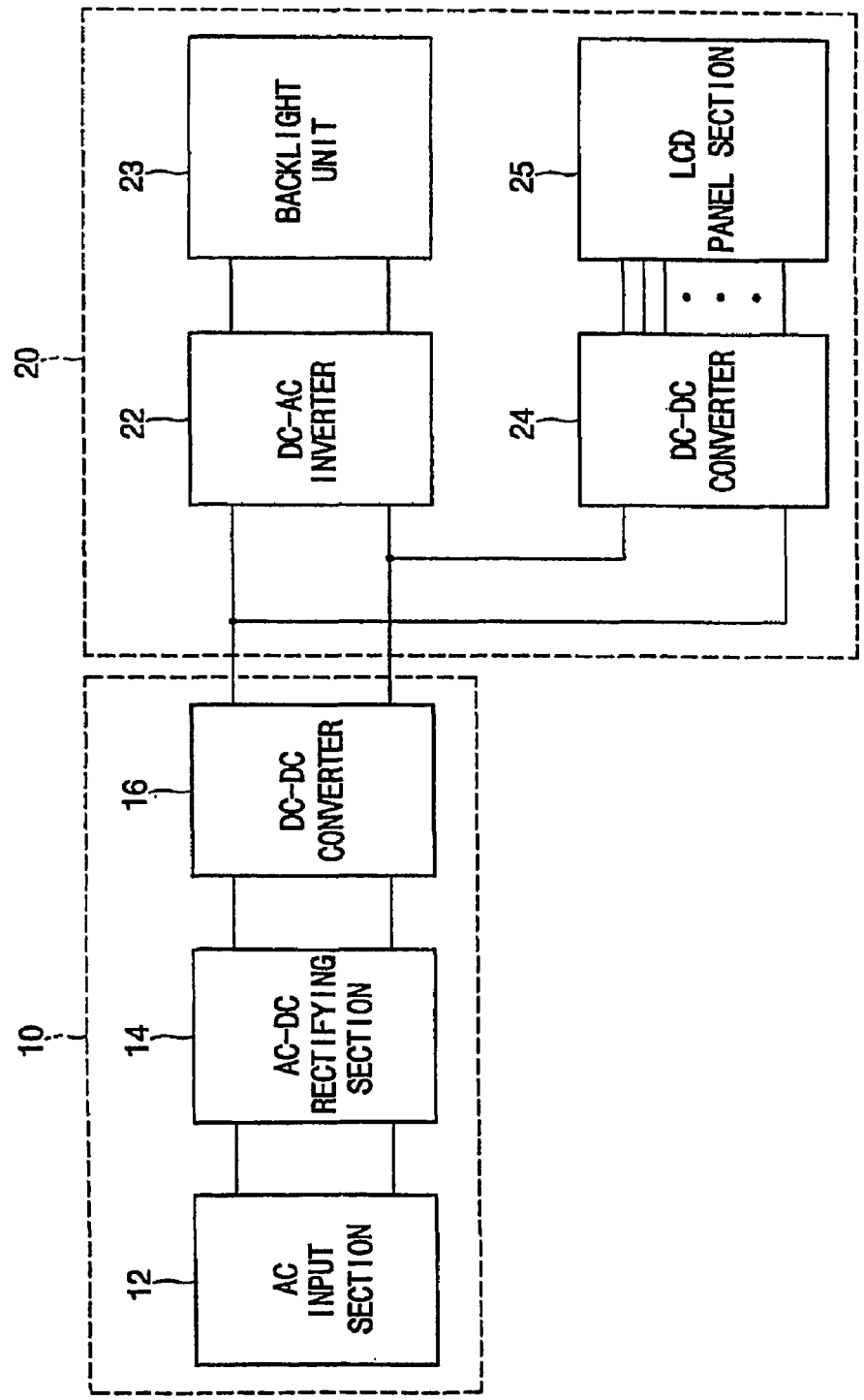
FIG. 1 is a block diagram illustrating a LCD monitor used in conventional desktop computer.
Figure 2:
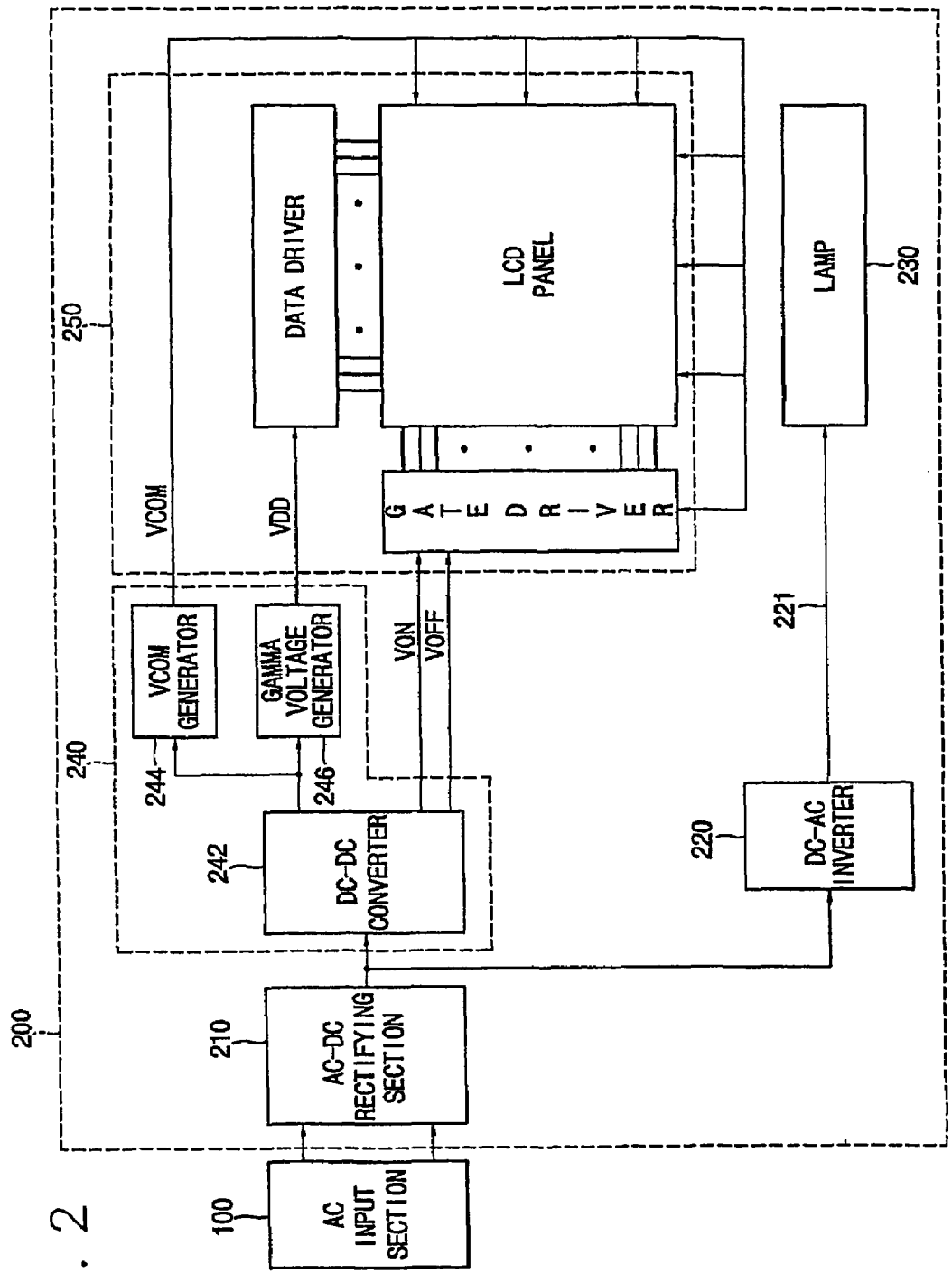
FIG. 2 is a block diagram illustrating a LCD according to one exemplary embodiment of the present invention.

FIG. 2 is a block diagram illustrating a LCD according to one exemplary embodiment of the present invention;

Referring to FIG. 2, the LCD includes an AC (alternating current) input section 100 and a LCD module 200.

The AC input section 100 receives a general alternating current voltage having a current level between about 100 volts and about 240 volts and provides the general alternating current voltage to the LCD module 200. Generally, the LCD module 200 can be provided with the general alternating current voltage by putting an electric plug into a plug-socket.

The LCD module 200 includes an ac-to-dc rectifier 210, a dc-to-ac inverter 220, a backlight unit 230, a dc-to-dc voltage converting section 240 and a LCD panel 250. The LCD module 200 receives the general alternating current voltage and displays an image provided from external graphic controller (not shown).

Specifically, the AC-to-DC rectifier 210 performs a power factor correction function when converting the general alternating current voltage in range of 100-240 volts into a high direct current voltage, and provides the converted direct current voltage to both the dc-to-dc voltage converting section 240 and the dc-to-ac inverter 220.

The ac-to-dc rectifier 210 can be embodied by a diode rectifier or an active pulse-width modulated (PWM) rectifier.

The dc-to-ac inverter 220 converts the high voltage generated from the ac-to-dc rectifier 210, for example a high direct current voltage having a voltage level between about 500 volts and 600 volts, into an alternating current voltage 221 appropriate for the backlight unit and outputs the alternating current voltage 221. The dc-to-ac inverter 220 can be embodied by any kind of inverter driven under a high voltage having a voltage level between 500 volts and 600 volts except the inverter driven under a low voltage having a voltage level between 5 volts and 12 volts. For example, the dc-to-ac inverter 220 can be embodied by a royer Inverter, a push-pull Inverter, a half bridge Inverter or a full-bridge Inverter.

Because the LCD module section 200 adopts the dc-to-ac inverter 220 that converts a high direct current voltage into a alternating current voltage, the LCD according to the present invention can use a more effective transformer with smaller coil turns in comparison with the conventional LCD monitor having a transformer with a large coil turns. Further, the LCD module section 200 can use the dc-to-ac inverter 220 without a transformer, to thereby reduce the cost of manufacturing a LCD monitor.

The backlight unit 230 includes fluorescent lamps disposed below a bottom surface of a LCD panel 250, controls an optical power of the light outputted from the fluorescent lamp based on the alternating current voltage 221 provided from the dc-to-ac inverter 220, and provide the light having a controlled optical power to the bottom surface of the LCD panel 250.

The dc-to-dc voltage converting section 240 includes a dc-to-dc converter 242, a common-electrode voltage generator 244 and a gamma voltage generator 246, changes a dc voltage level of a high voltage, for example in a range between 500 volts and 600 volts, into a low dc voltage for driving a data driver, a scan driver or a LCD panel 250 of the LCD panel section 250.

Specifically, dc-to-dc voltage converting section 240 changes a high-level dc voltage into a low level dc voltage, and provide the level shifted dc voltage to the common-electrode voltage generator 244 and the gamma voltage generator 246.

The dc-to-dc voltage converter 242 is embodied by a boost converter, a buck converter, a half-bridge converter, a flyback converter, a full-bridge converter, a push-pull converter and a forward converter.

The common-electrode voltage generator 244 generates a common-electrode voltage (VCOM) based on the level shifted dc voltage from the dc-to-dc converter 242, and provide the common-electrode voltage to the LCD panel section 250. It is desirous that the level shifted dc voltage is a power source for the common-electrode voltage generator 244.

The gamma voltage generator 246 generates a gamma voltage(VDD) based on the level shifted dc voltage from the dc-to-dc converter 242, and provides the gamma voltage to the LCD panel section 250. It is desirous that the level shifted dc voltage is a gamma reference voltage.

The common-electrode voltage generator 244 and gamma voltage generator 246 are included in the dc-to-dc voltage converting section 240 includes, but it is also possible that the common-electrode voltage generator 244 and gamma voltage generator 246 are included in the LCD panel section 250.

According to one preferred embodiment of the present invention, an external dc power supply, which is used in the conventional LCD monitor for note book PC (Personal Computer), is directly installed inside the LCD module section 200 as a part of the LCD module section 200 instead of directly connecting the external dc power supply with a LCD monitor for a desk top PC, to thereby reduce the cost for manufacturing the LCD monitor for a desk top PC.

In addition, according to one preferred embodiment of the present invention, the number of voltage converting steps decreases in comparison with that of the conventional voltage converting means.

Figure 3:
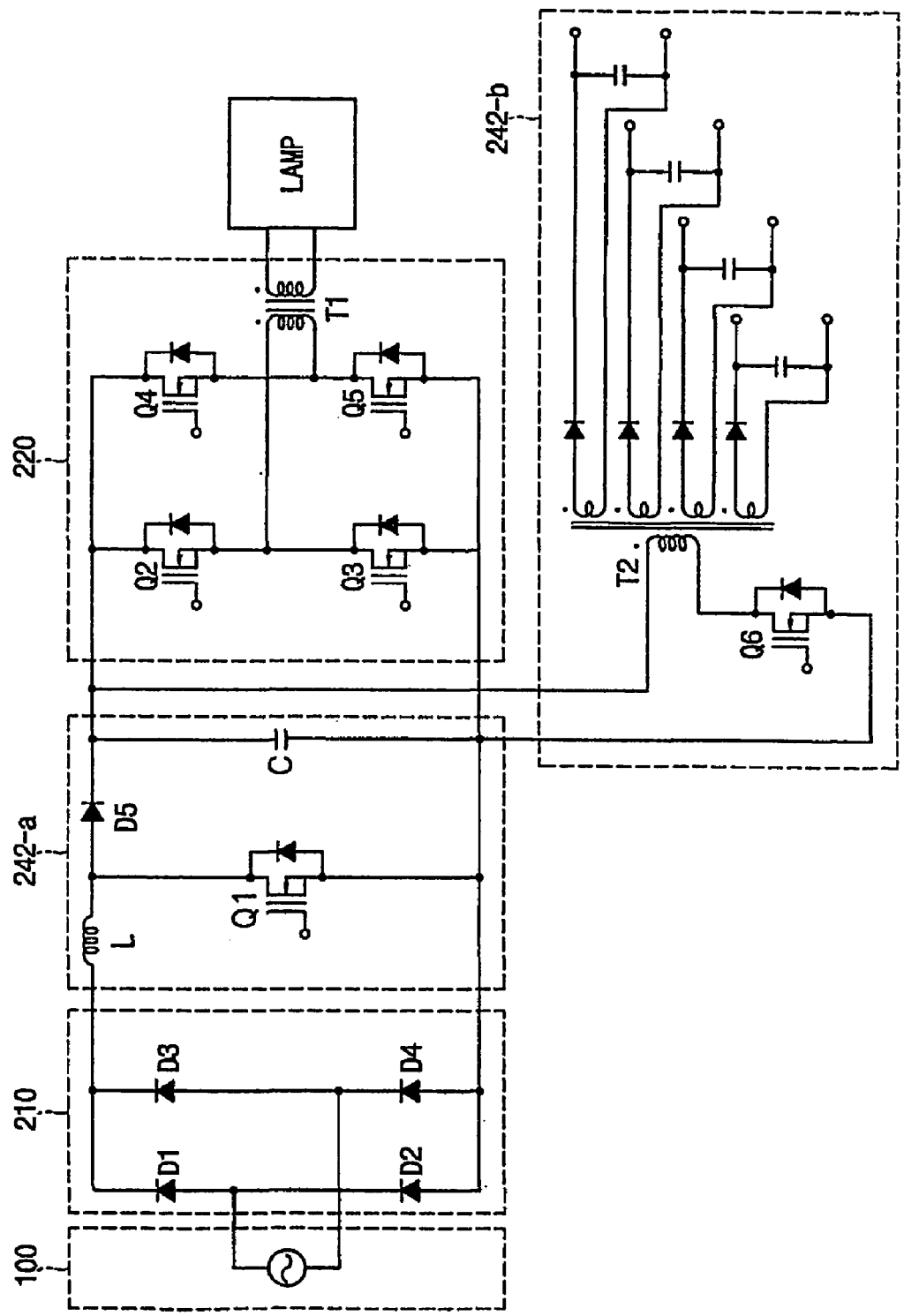
FIG. 3 is a circuit diagram showing a first specific circuit for implementing the LCD in FIG. 2.

FIG. 3 is a circuit diagram showing a first specific circuit for implementing the LCD in FIG. 2.

Referring FIG. 2 and FIG. 3, the AC input section 100 provides the general voltage having the voltage level between about 100 volts and about 240 volts to the ac-to-dc rectifier 210.

The ac-to-dc rectifier 210 includes two parallel connected diode series (D1, D2, D3 and D4), receives the general voltage, rectifies the general voltage, and provides the rectified general voltage to the dc-to-dc voltage converter 242-a.

The dc-to-dc converter 242-a is a boost converter that has a function of a power factor correction (PFC). Specifically, the dc-to-dc converter 242-a includes an inductor (L), a first MOSFET (Q1) and a capacitor (C). A first end of the inductor is connected a first end of the ac-to-dc diode rectifier. A drain of the Q1 is connected to a second end of the inductor (L), the drain and source of the Q1 is connected parallel with the diodes (D1, D2, D3, D4) through the inductor (L), and the source of the Q1 is connected to a second end of the ac-to-dc rectifier 210. A first end of the capacitor (C) is connected to an anode of a diode (D5) and a second end of the capacitor (C) is connected to the source of the Q1. The dc-to-dc converter 242-a raises the rectified voltage provided from the ac-to-dc rectifier 210, and provides the raised voltage to the dc-to-ac inverter 220 and a second dc-to-dc converter 242-b.

The dc-to-ac inverter 220 includes four MOSFETs (Q2, Q3, Q4 and Q5), a drain and a source of each MOSFET being connected with a diode, and a first transformer (T1). The dc-to-ac inverter 220 outputs a voltage for a backlight of a CCFL (Cold Cathode Fluorescent Lamp).

Specifically, the Q2 is connected with a diode through the drain and source of the Q2. The drain of the Q3 is connected serially to the source of the Q2, the source of the Q3 is connected a second end of the capacitor (C), and the drain and source of the Q3 is connected parallel with a diode. The drain of the Q4 is connected to the drain of the Q2, the drain and source of the Q4 is connected parallel with a diode. The drain of the Q5 is connected serially to the source of the Q4, the source of the Q5 is connected the source of the Q3, and the drain and source of the Q5 is connected parallel with a diode. A first end of the primary coil of T1 is connected with a common terminal between the Q2 and Q3, and a second end of the primary coil is connected with common terminal between the Q4 and Q5. The secondary coil of T1 is connected to a fluorescent lamp, raises a dc voltage inputted from the primary coil base on winding number of T1, and provides the raised voltage to the fluorescent lamp.

The second dc-to-dc converter 242-b is a flyback converter having a multiple output function, receives the raised voltage from the first dc-to-dc converter 242-a, and outputs a plurality of output voltages.

Especially, the second dc-to-dc converter 242-b includes a sixth MOSFET (Q6) which is connected to a diode through a drain and source of the Q6, a primary coil of T2 for generating a main power source, a magnetic core, a plurality of secondary coil of T2 for generating a plurality of subsidiary power source. The second dc-to-dc converter 242-b transmits a dc voltage inputted from the primary coil of T2 to the plurality of secondary coil of T2 through the magnetic core.

Preferably, the output voltage outputted through the primary coil of T2 can be used as a power source for the data driver that consumes a lot of power. The output voltage outputted through the secondary coil can be applied to the scan driver, and can be used as a gate on/off voltage (Von/Voff) for controlling turn-on or turn-off, as a reference voltage of the common-electrode voltage (Vcom) that is applied to a common-electrode line, and as a reference voltage for generating a gamma voltage.

Figure 4:
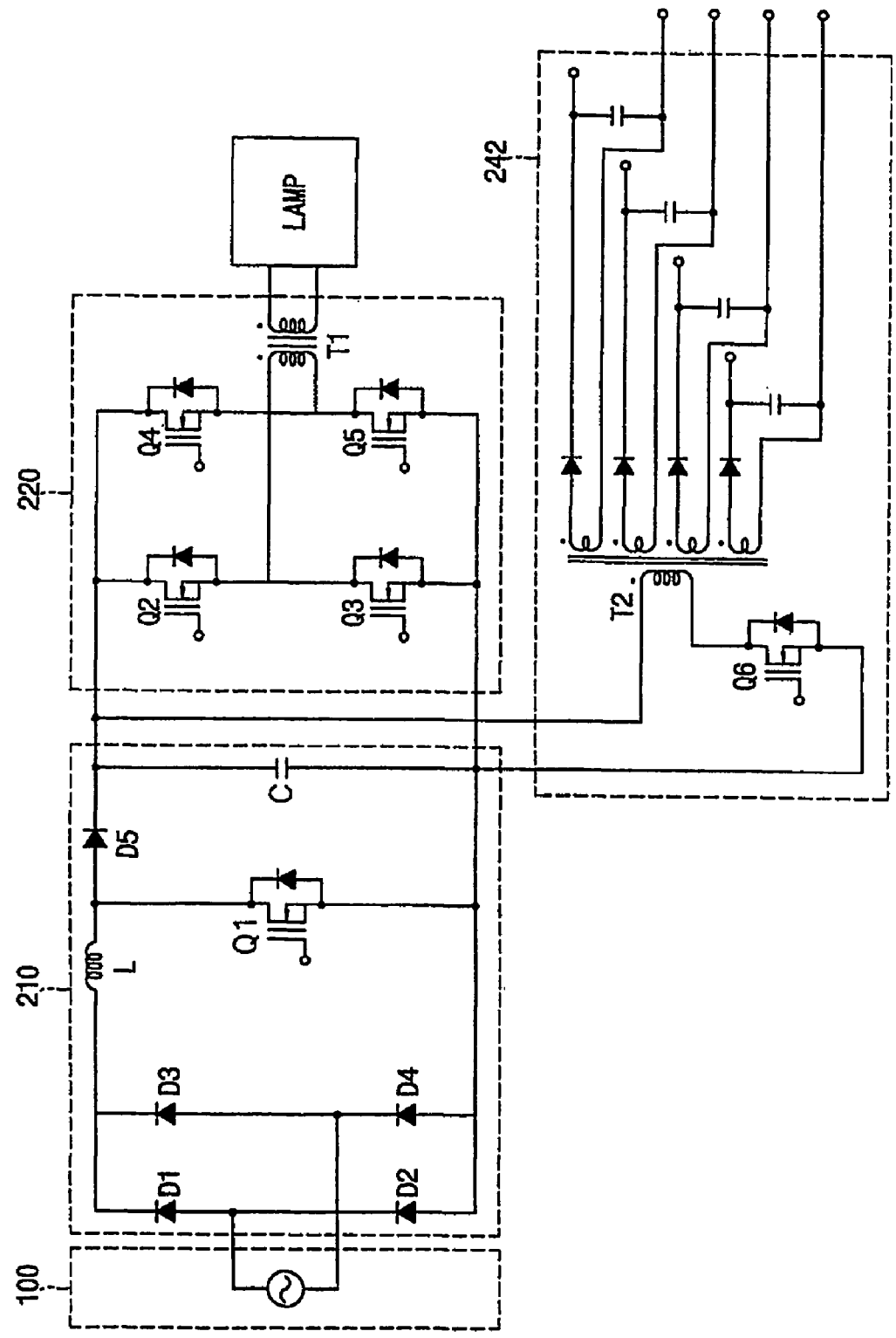
FIG. 4 is a circuit diagram showing a second specific circuit for implementing the LCD in FIG. 2.

FIG. 4 is a circuit diagram showing a second specific circuit for implementing the LCD in FIG. 2.

Referring to FIG. 2 and FIG. 4, the AC input section 100 provides the general ac voltage having the voltage level between about 100 volts and about 240 volts to the ac-to-dc rectifier 210.

The ac-to-dc rectifier 210 includes a bridge diode that converts the general ac voltage into a dc voltage, an inductor (L), a first MOSFET (Q1) that is connected parallel to the bridge diode through the inductor (L), a fifth diode (D5) and a capacitor (C). The ac-to-dc rectifier 210 includes a dc-to-dc converter, receives the general ac voltage, rectifies the general ac voltage into a dc voltage, and provides the rectified general voltage to the dc-to-ac inverter 220 and dc-to-dc voltage converter 242.

The bridge diode includes diodes (D1, D2, D3 and D4), rectifies the general ac voltage through the serially connected first and second diode (D1, D2) and third and fourth diodes (D3, D4), and changes a dc voltage level of the rectified general voltage through the dc-to-dc converter that includes a inductor (L), a first MOSFET (Q1) connected parallel to the bridge diode through the inductor (L), a fifth diode (D5) and a capacitor (C), and provides the level shifted dc voltage to the dc-to-ac inverter 220 and dc-to-dc voltage converter 242.

Especially, the ac-to-dc rectifier 210 includes a boost dc-to-dc converter that has a function of a power factor correction (PFC). Specifically, the boost dc-to-dc converter includes an inductor (L), a first MOSFET (Q1) and a capacitor (C). A first end of the inductor is connected a first end of the bridge diode. A drain and source of the Q1 is connected parallel with the bridge diodes through the inductor (L), the drain of the Q1 is connected to a second end of the inductor (L), and the source of the Q1 is connected to a second end of the bridge diode. A first end of the capacitor (C) is connected to an anode of a diode (D5) and a second end of the capacitor (C) is connected to the source of the Q1. The boost dc-to-dc converter raises the rectified voltage provided from the bridge diode in response to a control signal inputted from a gate of the Q1, and provides the raised voltage to the dc-to-ac inverter 220 and a dc-to-dc converter 242. The control signal applied to the gate of the Q1 is a detecting signal that is generated in response to a lamp tube current flowing through a fluorescent lamp. The control signal controls the raised voltage level of the boost dc-to-dc converter when detecting over-current through the fluorescent lamp.

The dc-to-ac inverter 220 includes four MOSFETs (Q2, Q3, Q4 and Q5), a drain and a source of each MOSFET being connected with a diode, and a first transformer (T1). The dc-to-ac inverter 220 outputs a voltage for a backlight.

The dc-to-dc converter 242 is a flyback converter having a multiple output function, receives the raised voltage from the ac-to-dc rectifier 210, and outputs a plurality of output voltages. A detail explanation about the dc-to-ac inverter 220 will not be repeated here because the detail description about the dc-to-ac inverter 220 is already given in FIG. 3.

On the other hand, a light source for replacing the conventional CCFL lamp has been developed as a light source of a backlight used in a LCD TV. A surface light source of a fluorescent lamp type, for example, can drives the entire LCD panel by only one driving circuit, can provide a light having a more uniform brightness to the entire LCD panel than the CCFL lamp for driving the direct type backlight. As a result, the thickness of the LCD panel can be maintained thin.

However, a operation voltage increases to a voltage level more than 2.5 Kv, especially more than 3.0 Kv in proportion to an increased length of the lamp tube because a fluorescent lamp should be bent so as to cover the entire surface of the LCD panel. The operation voltage of the surface light source of a fluorescent lamp type is higher than the operation voltage of the conventional CCFL, which is about 600-800 volts, by about 2.5-5 times. Accordingly, it is difficult to drive the surface light source of a fluorescent lamp type.

In addition, an EEFL (External Electrode Fluorescent Lamp) that has external electrodes on both ends of the fluorescent lamp tube, or EIFL (External Internal electrode Fluorescent Lamp) that has an external and internal electrode on a first and second end of the fluorescent lamp tube, respectively, has been developed. However, these EEFL or EIFL also requires a higher operation voltage than the conventional CCFL.

Hereinafter, a power supply for a fluorescent lamp that requires a high operation voltage is disclosed.

Figure 5:
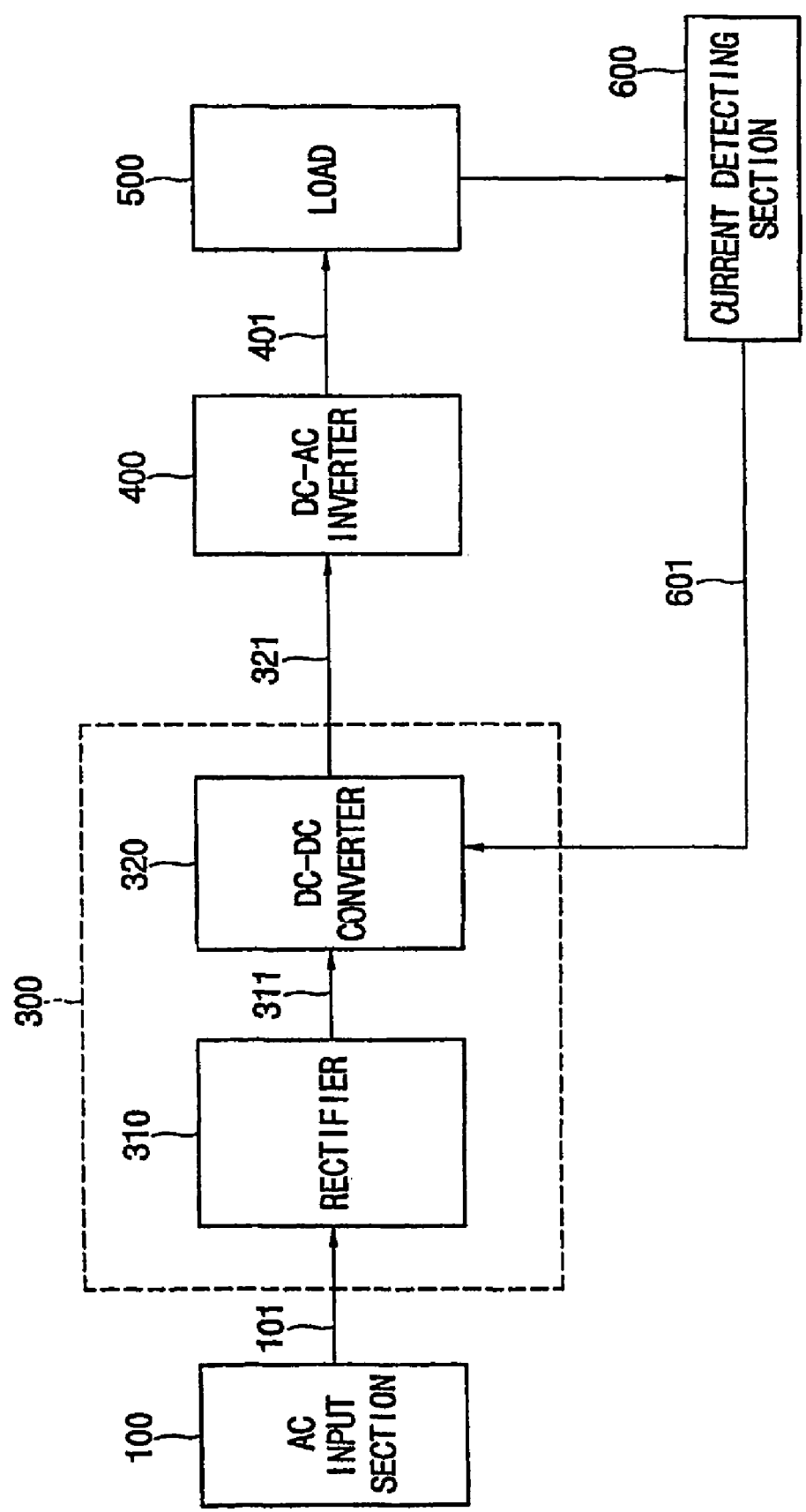
FIG. 5 is a block diagram illustrating a power supplier according to one exemplary embodiment of the present invention.

FIG. 5 is a block diagram illustrating a power supplier, especially for supplying a voltage to a load consuming a high voltage, according to one exemplary embodiment of the present invention, Referring to FIG. 5, the power supply of the present invention includes an AC input section 100, a first voltage converting section 300, a second voltage converting section 400 and a current detecting section 600.

The AC input section 100 provides a general voltage having a voltage level between 100 volts and 240 volts to the first voltage converting section 300.

The first voltage converting section 300 is an adaptor that includes a rectifier 310 and a dc-to-dc converter 320. The first voltage converting section 300 rectifiers the general ac voltage signal 101, converts the rectified signal into a dc voltage signal 321, provides the converted dc voltage signal 321 to the second voltage converting section 400, and controls a voltage level of the dc voltage signal that is outputted to the second voltage converting section 400 in response to a current detecting signal 601 provided from the current detecting section 600.

Specifically, the rectifier 310 rectifies the general ac voltage signal 101 provided from the AC input section 100, converts the rectified signal into a dc voltage signal 311, provides the converted dc voltage signal 311 to the dc-to-ac inverter 320. Preferably, the rectifier 310 is an ac-to-dc diode rectifier.

The dc-to-dc converter 320 converts a voltage level of the dc voltage signal 311 provided from the rectifier 310 into the dc voltage signal 321, provides the dc voltage signal 321 to the second voltage converting section 400, controls a voltage level of a output dc voltage signal in response to a current detecting signal 601 provided from the current detecting section 600, and outputs the controlled dc voltage signal. The dc-to-dc converter 320 can raise, lower the voltage level of the inputted dc voltage signal, or bypass the inputted dc voltage signal.

The dc-to-dc converter 320 outputs a dc voltage signal having a lower voltage level than that of a dc voltage signal outputted from the dc-to-dc converter 320 in response to the current detecting signal 601 when a larger current than a predetermined critical value is detected in the load 500. The dc-to-dc converter 320 outputs a dc voltage signal having a higher voltage level than that of a dc voltage signal outputted from the dc-to-dc converter 320 in response to the current detecting signal 601 when a smaller current than a predetermined critical value is detected in the load 500.

The second voltage converting section 400 a dc-to-ac inverter, raises or lower a voltage level of the dc voltage signal 321 provided from the dc-to-dc converter 320, converts the level shifted dc voltage signal into an ac voltage signal 401, and provides the converted ac voltage signal to the load 500.

The current detecting section 600 detects a current level of the currents flowing in the load 500, provides a current detecting signal 601 corresponding to the detected current level to the dc-to-dc converter 320 of first voltage converting section 300.

Hereinafter, a LCD having the power supply of FIG. 5 is disclosed.

Figure 6:
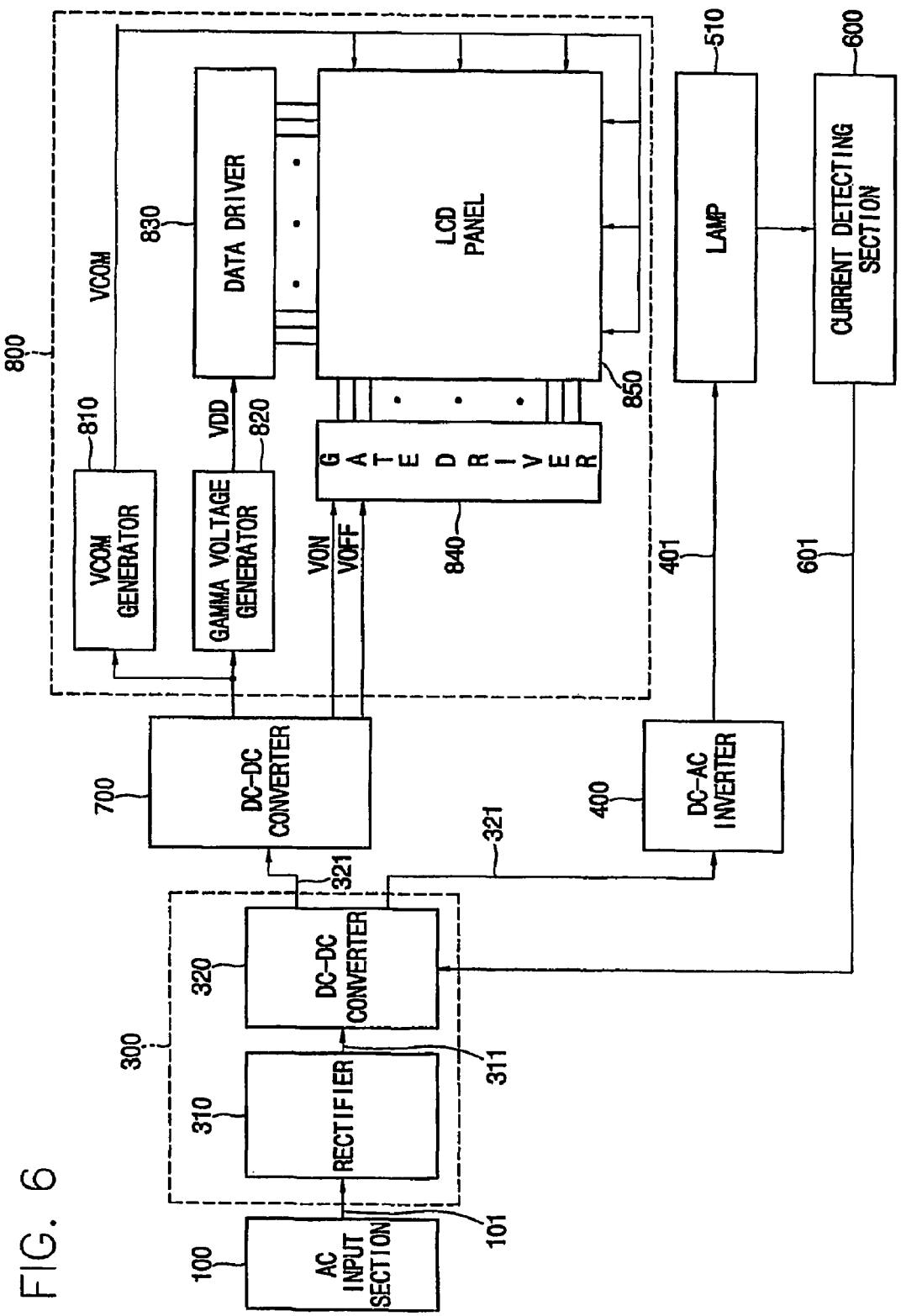
FIG. 6 is a block diagram illustrating a LCD having the power supply in FIG. 5 according to one exemplary embodiment of the present invention.

FIG. 6 is a block diagram illustrating a LCD having the power supply in FIG. 5 according to one exemplary embodiment of the present invention.

Referring to FIG. 6, the LCD according to the present invention includes an AC input section 100, a first voltage -converting section 300, a second voltage converting section 400, a fluorescent lamp 510, a current detecting section 600, a third voltage converting section 700 and a LCD module 800.

The AC input section 100 provides a general alternating current voltage having a current level between about 100 volts and about 240 volts to the first voltage converting section 300. Generally, the AC input section 100 can provide the general alternating current voltage by putting an electric plug into a plug-socket.

The first voltage converting section 300 is an adaptor that includes a rectifier 310 and a first dc-to-dc converter 320. The first voltage converting section 300 rectifiers the general ac voltage signal 101, converts the rectified signal into a dc voltage signal 321, provides the converted dc voltage signal 321 to the second voltage converting section 400 and the third voltage converting section 700. Preferably, the rectifier 310 can be an ac-to-dc diode rectifier.

The second voltage converting section 400 includes a dc-to-ac inverter, converts the dc voltage signal provided from the dc-to-dc converter 320 of the first voltage converting section 300 into an ac voltage signal 401, and provides the converted ac voltage signal 401 to the fluorescent lamp 510.

The fluorescent lamp emits a light to the LCD module 800 in response to an ac current signal provided from the second voltage converting section 400.

The current detecting section 600 detects a current level of the lamp tube current flowing in the fluorescent lamp 510, provides a current detecting signal 601 to the dc-to-dc converter 320 of first voltage converting section 300.

The third voltage converting section 700 includes a dc-to-dc converter, converts the dc voltage provided from the first voltage converting section 300 into a plurality of dc voltage, and provides the converted plurality of dc voltage to the LCD module 800. Preferably, the dc-to-dc converter can be a flyback converter.

The LCD module 800 includes a common-electrode voltage generator 810, a gamma voltage generator 820, a data driver, a gate driver and a LCD panel 850, and displays an image in response to the dc voltage signal provided from the third voltage converting section 700.

Specifically, the common-electrode voltage generator 810 generates a common-electrode voltage (VCOM) based on the level shifted dc voltage from the third voltage converting section 700, and outputs the common-electrode voltage to the LCD panel 850.

The gamma voltage generator 820 generates a gamma voltage(VDD) based on the level shifted dc voltage from the third voltage converting section 700, and outputs the gamma voltage to the data driver 830.

The data driver 830 produces a gamma-corrected image signal for displaying an image based on the gamma voltage provided from the gamma voltage generator 820, and provides the gamma corrected image signal to the LCD panel 850.

The gate driver 840 generates a scan signal based on a dc voltage provided from the third voltage converting section 700, preferably a gate-on/gate-off signal (Von/Voff), and outputs sequentially the generated scan signal to the LCD panel 850.

The LCD panel 850 includes a plurality of gate lines, a plurality of data lines, and a plurality of pixels. The gate lines transmit the scan signal from the gate driver 840. The data lines transmit a data voltage signal provided from the data driver 830, are intersected with the gate lines, and are insulated from the gate lines. Each pixel is formed on a region surrounded by the gate lines and data lines, is arranged in a matrix shape, and includes a TFT (Thin Film Transistor) that is connected to gate line and data line.

When the gate-on signal is applied to the gate line and then the TFT is turned on, the data voltage (Vd) provided to the data line is applied to each pixel electrode. An electric field, which is corresponding to the difference voltage between the pixel voltage applied to the pixel electrode and the VCOM applied from the common-electrode voltage generator 810, is applied to a liquid crystal capacitor, and a light transmits the liquid crystal with a transmittance corresponding to the applied electric field, so that an image is displayed.

When the fluorescent lamp consumes a high voltage, in the conventional inverter circuit raises again a voltage level of the input dc voltage by means of the buck converter, converts the raised dc voltage into an ac voltage, to thereby require 2 stages. However, according to the present invention, the high voltage that the fluorescent lamp requires can be provided even though the buck converter is not used.

In addition, according to the present invention, the convenience and efficiency for driving the fluorescent lamp can be enhanced because the inverter circuit includes only a royer inverter block but not a buck converter block, i.e. a dc-to-dc converter that is located at the front stage of the royer inverter block.

Figure 7:
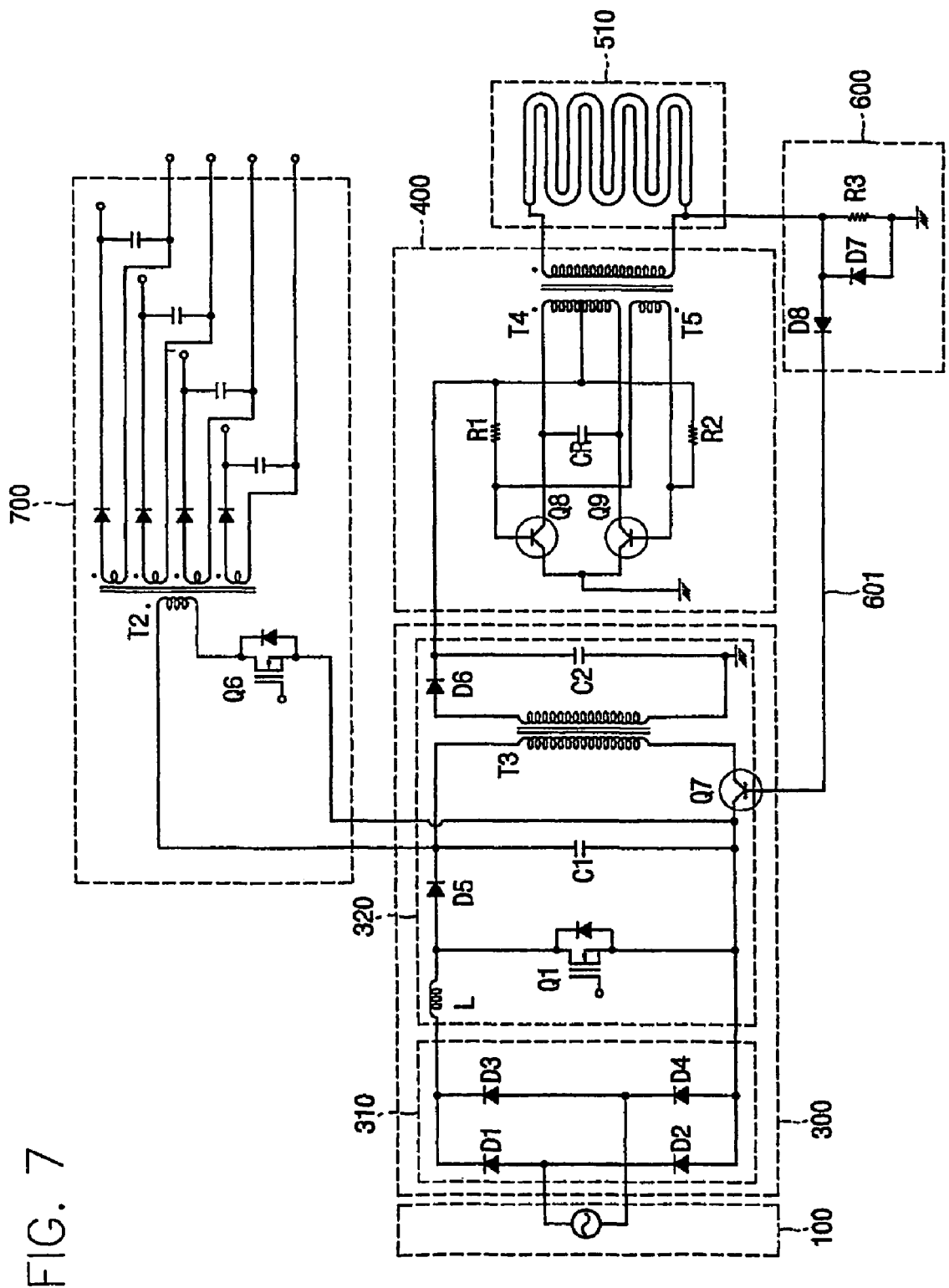
FIG. 7 is a circuit diagram showing a specific circuit for implementing the power supplier in FIG. 6.

FIG. 7 is a circuit diagram showing a specific circuit for implementing the power supplier in FIG. 6.

Referring to FIG. 7, the first voltage converting section 300 includes an ac-to-dc diode rectifier 310 and a dc-to-dc converter 320. The first voltage converting section 300 rectifiers the general ac voltage signal, converts the rectified signal into a dc voltage signal, provides the converted dc voltage signal to the second voltage converting section 400 and the third voltage converting section 700.

Specifically, the ac-to-dc diode rectifier 310 includes a bridge diode having a first, second, third and fourth diodes (D1, D2, D3 and D4), rectifies the general ac voltage through the serially connected first and second diode (D1, D2) and third and fourth diodes (D3, D4), and provides the rectified dc voltage signal to the dc-to-dc converter 320.

The dc-to-dc converter 320 includes a inductor (L) of which a first end is connected to a output terminal of the ac-to-dc diode rectifier 310, a first MOSFET (Q1) connected parallel to the bridge diode through the inductor (L), a fifth diode (D5) and a capacitor (C). The dc-to-dc converter 320 smoothes the rectified voltage signal from the ac-to-dc diode rectifier 310, raises a voltage level of the smoothen voltage signal, and provides the level shifted dc voltage to the second voltage converting section 400. Preferably, the switching device Q7 can be a bipolar transistor, an emitter of Q7 is connected to a second end of the capacitor (C1), a corrector of Q7 is connected to a primary coil of a transformer (T3), and a base of Q7 is connected a output terminal of the current detecting section 600. The switching device Q7 controls the raising operation of the transformer (T3) in response to the current detecting signal 601.

The second voltage converting section 400 is a dc-to-ac inverter of a royer type, converts a dc voltage signal provided from the dc-to-dc converter 320 into an ac voltage signal, and provides the converted ac voltage signal to the fluorescent lamp 510.

Specifically, the dc voltage signal converted by the dc-to-dc converter 320 is applied to bases of each transistor (Q7, Q9), which is an input of the second voltage converting section 400, through parallel-connected resistors (R1, R2). The primary coil of a transformer (T4) having a coil-tap is connected parallel with collectors of the transistors (Q8, Q9) of which emitter is connected to the ground, and is connected parallel to a resonance capacitor (CR).

In addition, the dc voltage is applied to the coil-tap of the primary coil of transformer (T4) through an inductor (L) including a choke coil (not shown) for converting the current provided to the second voltage converting section 400 into a constant current.

The secondary coil of T4 has a winding number larger than the primary coil of T4, raises a voltage level of the voltage signal applied to the primary coil to a voltage signal having a higher voltage level, and provides the raised voltage to the fluorescent lamp connected parallel to both ends of the secondary coil of T4. A positive and negative level of the constant voltage can have the same magnitude, or the interval between a maximum and minimum voltage level can be the same.

On the other hand, a first end of the primary coil of T5 is connected to a base of the transistor (Q8), a second end of the primary coil of T5 is connected to a base of the transistor (Q9), and the voltage applied to the primary coil of T5 is applied to the bases of transistors (Q8, Q9).

Hereinafter, the operation of the dc-to-ac inverter will be described.

First, when a dc voltage, which is a pulse signal, is applied to the dc-to-ac inverter, a current flows to the primary coil of T4 through the inductor (L). The dc voltage of a pulse shape is simultaneously applied to the base of Q8 through the first resistor (R1), and applied to the base of Q9 through the second resistor (R2). A reactance of the primary coil of T4 and the resonance capacitor can generate a LC resonance. A raised voltage is induced at both ends of the secondary coil of T4, the raised voltage level being in proportion to a ratio N2/N1 (N1: winding number of the primary coil of T4, N2: winding number of the secondary coil of T4). Simultaneously, a current flows at a primary coil of T5 in a reverse direction to a current flowing at a primary coil of T4.

Then, the voltage level of the second coil of T4 is raised in proportion to a winding ratio N1'/N1 (N1': winding number of the primary coil of T5, N1: winding number of the primary coil of T4), and a high voltage signal with a frequency and phase synchronized with the secondary coil of T4 opposite to the primary coil of T4. The high voltage signal that has a frequency and phase synchronized with the secondary of T4 can prevent a flicker phenomenon from generating in the fluorescent lamp 510.

The fluorescent lamp 510 emits a light to the LCD module in response to the ac voltage signal provided from the second voltage converting section 400. The fluorescent lamp 510 is a fluorescent lamp that requires an operation voltage having a higher voltage level—i.e. higher than 2.5 Kv or higher than 3.0 Kv—than that of the operation voltage between 500 volts and 600 volts required by the CCFL. Namely, the fluorescent lamp 510 is a fluorescent lamp that can cover the entire surface of the LCD panel when the fluorescent lamp is bended, for example a EEFL or EIFL.

The current detecting section 600 detects a current level of the currents flowing through the fluorescent lamp 510, and provides the current detecting signal 601 corresponding to the detected current level to the dc-to-dc converter 320 of the first voltage converting section 300.

Specifically, the current detecting section 600 includes a third resistor (R3), a seventh diode (D7) and an eighth diode (D8). A first end of the third resistor is connected a second end of the fluorescent lamp 510, and a second end of the third resistor (R3) is connected to the ground. A cathode of the diode (D7) is connected to the second end of the fluorescent lamp 510, and an anode of the diode (D7) is connected to the ground. A cathode of the diode (D8) is connected to the dc-to-dc converter 320, and an anode of the diode (D8) is connected to the second end of the fluorescent lamp 510.

The current detecting section 600 detects the lamp tube current outputted through the second end of the fluorescent lamp, provides the detected lamp tube current to the base of Q7, and requests to raise or lower the voltage level of the output dc voltage of the dc-to-dc converter 320. The dc-to-dc converter 320 raises or lowers the voltage level of the output dc voltage based on the current detecting signal 601 provided from the current detecting section 600, and the controlled output dc voltage is provided to the fluorescent lamp 510 through the dc-to-ac inverter 400.

A detail description about a third voltage converting section 700 is not repeated because the third voltage converting section 700 is the same as the dc-to-dc converter 242 of FIG. 4.

As mentioned above, according to the present invention, the first voltage converting section 300—i.e. an adaptor—converts the commercial ac voltage inputted from the AC input section 100 into a dc voltage having a voltage level between about 150 volts and 250 volts, and into a dc voltage having a voltage level about 12 volts. The converted dc voltage having a voltage level between about 150 volts and 250 volts is used as a voltage source for driving a backlight, and the converted dc voltage having a voltage level about 12 volts is used as a voltage source for driving a LCD panel.

The royer inverter of the dc-to-ac inverter 400 raises the dc voltage having a voltage level between about 150 volts and 250 volts into a higher ac voltage—i.e. about ac 3 Kv—that is a driving voltage of the fluorescent lamp consuming a high voltage. The current of the fluorescent lamp can be controlled by varying the output voltage—i.e. between about 150 volts and about 200 volts—of the first voltage converting section 300.

According to the present invention, a relatively high dc voltage is converted into a high ac voltage in the dc-to-ac inverter 400, and the coil winding ratio—i.e. the ratio N1/N2 of the transformer (T4) located at a royer inverter of the dc-to-ac inverter 400—is several tens times, so that it does not require a transformer having a high winding number.

In addition, according to the present invention, it can solve an excessive heating problem because a relatively high voltage, for example between 150 volts and 250 volts, is applied to a power line of the dc-to-ac inverter 400 to reduce a current of the dc-to-ac inverter 400.

In addition, the dc-to-dc converter 320 of the first voltage converting section 300 directly receives a current feedback signal—i.e. current detecting signal 601—, and a buck converter can be removed while the dc-to-ac inverter is used, so that it can enhance power efficiency of the power supply according to the present invention.

As mentioned above, according to the present invention, a load can be supplied with a power without lowering the power efficiency even though the load consuming power requires a high voltage, and the buck converter can be removed from the inverter circuit that converts a dc voltage into an ac voltage, so that a manufacturing cost can be reduced.

In addition, according to the present invention, a total cost for manufacturing the LCD monitor can be reduced by removing an external dc power supply, a user can install and carry the LCD monitor conveniently, and working environment can be maintained clean.

In addition, according to the present invention, when manufacturing the LCD monitor used for a desktop PC, a number of voltage converting steps can be decreased in comparison with the conventional voltage converting steps of the LCD monitor that uses the conventional power supply used for a notebook computer, to thereby enhance the efficiency of the power supply.

In addition, according to the present invention, a transformer with a small winding number can be substituted for the conventional transformer with a large winding number by applying a high voltage to an inverter circuit.

In addition, according to the present invention, an inverter circuit without a transformer can be implemented, and the conventional dc-to-dc converter (power module converter) can be used without any modification of a circuit of the conventional dc-to-dc converter.

In addition, according to the present invention, a high dc voltage is converted to a high ac voltage, and the converted high ac voltage is applied to the dc-to-ac inverter, so that it is not required a transformer having a large winding number in the royer inverter of the dc-to-ac inverter.

Although the invention is described with reference to exemplary embodiments, it is understood that the present invention should not be limited to these exemplary embodiments but various changes and modifications can be made by one ordinary skilled in the art within the spirit and scope of the appended claims.

The invention claimed is:

1. A power supplying apparatus, comprising:
   a first voltage converting means for converting a first alternating current voltage into a first direct current voltage, and for changing a voltage level of the first direct current voltage into a second direct current voltage having a higher voltage level than the voltage level of the first direct current voltage;

a second voltage converting means for converting the second direct current voltage into a second alternating current voltage, and for changing a voltage level of the second alternating current voltage into a third alternating current voltage having a higher voltage level than the voltage level of the second alternating current voltage to provide the third alternating current voltage to a first load; and a current detector for detecting a current flowing through the first load, and for providing a current detecting signal to the first voltage converting means so that the first voltage converting means provides a constant direct current output voltage, wherein the power supplying apparatus includes an AC input section and a liquid crystal display (LCD) module section, wherein the first voltage converting means and the second voltage converting means are formed in the LCD module section, wherein the second voltage converting means comprises:

a transformer including a primary coil and a secondary coil, the primary coil of the transformer being connected to an output terminal of the first voltage converting means, and the secondary coil of the transformer being connected the first load;

a resonance capacitor, connected in parallel with the primary coil, for forming an LC resonance circuit;

a first transistor, a base of the first transistor being connected to the output terminal of the first voltage converting means, a collector of the first transistor being connected to a first end of the resonance capacitor, and an emitter of the first transistor being connected to a ground, for driving the transformer;

a second transistor, a base of the second transistor being connected to the output terminal of the first voltage converting means, a collector of the second transistor being connected to a second end of the resonance capacitor, and an emitter of the second transistor being connected to the ground, for driving the transformer.

2. A power supplying apparatus, comprising:

a first voltage converting means for converting a first alternating current voltage into a first direct current voltage, and for changing a voltage level of the first direct current voltage into a second direct current voltage having a higher voltage level than the voltage level of the first direct current voltage;

a second voltage converting means for converting the second direct current voltage into a second alternating current voltage, and for changing a voltage level of the second alternating current voltage into a third alternating current voltage having a higher voltage level than the voltage level of the second alternating current voltage to provide the third alternating current voltage to a first load; and a current detector for detecting a current flowing through the first load, and for providing a current detecting signal to the first voltage converting means so that the first voltage converting means provides a constant direct current output voltage, wherein the second voltage converting means comprises:

a transformer including a primary coil and a secondary coil, the primary coil of the transformer being connected to an output terminal of the first voltage converting means, and the secondary coil of the transformer being connected the first load;

a resonance capacitor, connected in parallel with the primary coil, for forming an LC resonance circuit;

a first transistor, a base of the first transistor being connected to the output terminal of the first voltage converting means, a collector of the first transistor being connected to a first end of the resonance capacitor, and an emitter of the first transistor being connected to a ground, for driving the transformer;

a second transistor, a base of the second transistor being connected to the output terminal of the first voltage converting means, a collector of the second transistor being connected to a second end of the resonance capacitor, and an emitter of the second transistor being connected to the ground, for driving the transformer.

3. The power supplying apparatus of claim 2, wherein the first voltage converting means comprises:

a rectifying means for rectifying the first alternating current voltage into the first direct current voltage; and a dc-to-dc converter for converting the first direct current voltage into the second direct current voltage to provide the second direct current voltage to the second voltage converting means, wherein said dc-to-dc converter varies the voltage level of the second direct current voltage in response to the detected current signal.

4. The power supplying apparatus of claim 2, wherein the second voltage converting means is a royer inverter, a push-pull Inverter, a half bridge Inverter or a full-bridge Inverter.

5. The power supplying apparatus of claim 2, wherein the second voltage converting means further comprises a first resistor, a first end of the first resistor being connected to the base of the first transistor, and a second end of the first resistor being connected to the output terminal of the first voltage converting means.

6. The power supplying apparatus of claim 2, wherein the second voltage converting means further comprises a second resistor, a first end of the second resistor being connected to the base of the second transistor, and a second end of the second resistor being connected to the output terminal of the first voltage converting means.

7. The power supplying apparatus of claim 2, wherein the first alternating current voltage is a commercial alternating current voltage, and the second direct current voltage has a voltage level between about 150 volts and about 200 volts.

8. The power supplying apparatus of claim 2, wherein the first voltage converting means further generates a third direct current voltage having a voltage level lower than the voltage level of the first direct current voltage and provides the third direct current voltage to a second load, by receiving the first alternating current voltage.

9. The power supplying apparatus of claim 8, further comprising a third voltage converting means for providing the third direct current voltage to the second load.

* * * * *